United States Patent
Hansen

(10) Patent No.: US 6,749,796 B1
(45) Date of Patent: Jun. 15, 2004

(54) DEVICE FOR PRODUCING EXTRUSION BLOW-MOLDED CONTAINERS WITH AT LEAST TWO CHAMBERS

(76) Inventor: Bernd Hansen, Talstr. 22-30, D-74429 Sulzbach-Laufen (DE)

(*) Notice: Subject to any disclaimer, the term of this patent is extended or adjusted under 35 U.S.C. 154(b) by 0 days.

(21) Appl. No.: 09/959,574
(22) PCT Filed: Jun. 7, 2000
(86) PCT No.: PCT/EP00/05222
§ 371 (c)(1),
(2), (4) Date: Oct. 30, 2001
(87) PCT Pub. No.: WO00/76744
PCT Pub. Date: Dec. 21, 2000

(30) Foreign Application Priority Data

Jun. 9, 1999 (DE) .......................... 199 26 329

(51) Int. Cl.⁷ ............................................... B29C 49/04
(52) U.S. Cl. ...................... 264/524; 264/539; 264/540; 53/476; 53/477; 53/478
(58) Field of Search ............................... 264/524, 539, 264/540; 53/476–8, 485

(56) References Cited

U.S. PATENT DOCUMENTS

| 5,398,828 A | * | 3/1995 | Valyi | .......................... 215/396 |
| 5,849,241 A | | 12/1998 | Connan | ....................... 264/529 |

FOREIGN PATENT DOCUMENTS

| DE | 1179356 | 10/1964 |
| DE | 1586023 | 10/1970 |
| JP | 58056827 | 4/1983 |
| JP | 61171321 | 8/1986 |
| WO | 9726126 | 7/1997 |

* cited by examiner

Primary Examiner—Suzanne E. McDowell
(74) Attorney, Agent, or Firm—Roylance, Abrams, Berdo & Goodman, LLP

(57) ABSTRACT

A process for producing containers involves a tube and at least one separating partition, both formed from plasticized synthetic material. The partition extends within the tube. The tube and partition are extruded into an opened blow mold. The blow mold is then closed, and the tube is expanded by producing a pressure gradient that acts upon the tube. The pressure gradient is applied to expand the tube against the molding wall of the blow mold to form the container. The end of the tube that is the front end during the extrusion step and the front end of every separating partition are welded together by closing the opened blow mold, thereby closing the base of the container that is linked with every separating partition. The tube is expanded by adding blowing air from the end of the closed blow mold that is opposite to the container base and that is assigned to the container neck in such a manner that the blowing air has an expanding effect on both sides of the separating wall, thereby forming chambers in the container that are separate from one another.

10 Claims, 8 Drawing Sheets

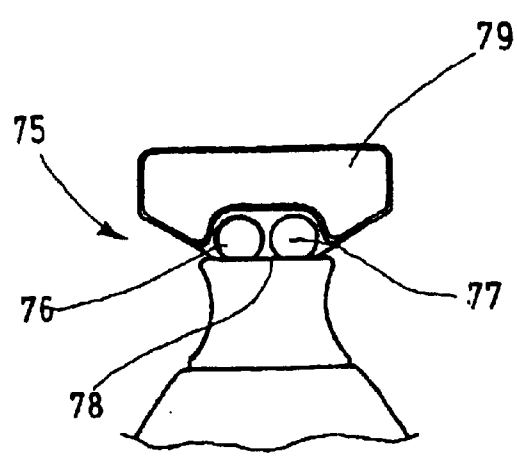
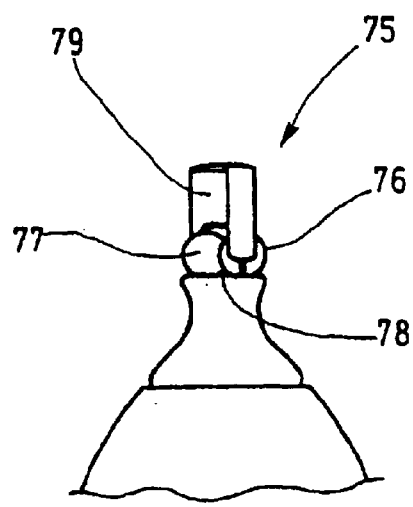
Fig. 12  Fig. 13
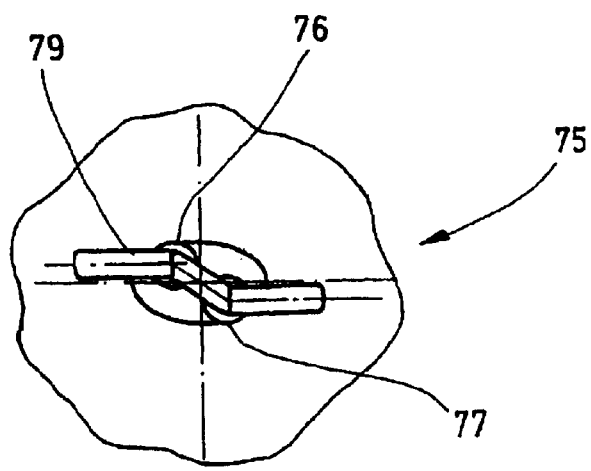
Fig. 14

US 6,749,796 B1

DEVICE FOR PRODUCING EXTRUSION BLOW-MOLDED CONTAINERS WITH AT LEAST TWO CHAMBERS

FIELD OF THE INVENTION

The present invention relates to a process for producing containers, in which a tube of plasticized synthetic material with at least one partition are formed from the synthetic material. The partition extends continuously in the interior of the tube. The tube and partition are extruded into an opened blow mold. The blow mold is closed. By producing a pressure gradient acting on the tube, the tube is expanded and is placed against the molding wall of the blow mold to form the container.

BACKGROUND OF THE INVENTION

A process of producing container with a partition is disclosed in DE 1 179 356 A1. In this process, when the blow mold is closed, the back end of the tube during extrusion is welded by weld edges located on the top of the blow mold in a hot-wire welding process. The synthetic material forming the container bottom is separated from the synthetic material which is leaving the overlying extruder means. The tube is expanded by supplying blowing air from the opposite lower end of the blow mold, specifically through the container neck molded on the lower end of the blow mold.

In the execution of the known process, the continued processing necessary for producing finished containers is rather elaborate. Thus, the container before filling must be removed from the blow mold which was opened beforehand and turned so that the container neck is at the top. Other working steps are then necessary for filling and producing a container closure.

SUMMARY OF THE INVENTION

An object of the present invention is to provide a process which enables comparatively more efficient production of ready-to-use containers with an internal partition.

This object is achieved in a process according to the present invention by welding the end of the tube which is the front end during extrusion and the front end of the partition to one another by closing the opened blow mold in order to close the container bottom and connect the bottom to the partition. By expanding the tube by supplying blowing air from the end of the closed blow mold which is assigned to the container neck and which is opposite the container bottom, the blowing air on either side of each partition acts to expand and form chambers which are separate from one another in the container.

The top end of the mold cavity of the blow mold is assigned to the container neck. The ends of the tube and of the pertinent partition which are the front ends during extrusion provide the parts of synthetic material which reach the lower end of the blow mold, and are welded to form the container bottom according to the present invention. Accordingly, the expanded container can be further processed within the closed blow mold by carrying out the filling process for each inner container chamber through the container neck after expanding the container by means of blowing air introduced through the container neck on both sides next to each partition, without opening the blow mold or removing the container.

The filling process can be carried out by a combined blowing and filling mandrel or by a separate filling mandrel inserted into the container after withdrawing the blowing mandrel from it.

One special advantage of the process of the present invention is that, after filling the container, the container neck is finish-molded by an additional welding process which takes place with the blow mold still closed. In doing so, at the same time, it can be hermetically sealed with a closure formed by the welding process. This closing can take place by movable top welding jaws or head jaws located on the top of the blow mold. Any desired molding processes and/or closure processes can be carried out. For example, a closure which can be torn off at a scored site or disconnect can be formed, preferably in the form of a rotary lock closure. An outside thread could also be molded on the container neck to form a screw closure with a separate closure element. In the welding process carried out on the container neck, separate closures for each chamber of the container or a closure which closes all chambers of the container jointly can be formed.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 12 is a partial side elevational view of the neck part of a container produced using the process according to the present invention, a rotary lock closure being shown as the hermetic seal of the two container chambers;

FIG. 13 is another side elevational view of the container neck part of FIG. 12; and FIG. 14 is a top plan view of the container neck part of FIG. 12.

DETAILED DESCRIPTION OF THE INVENTION

Figure 1:
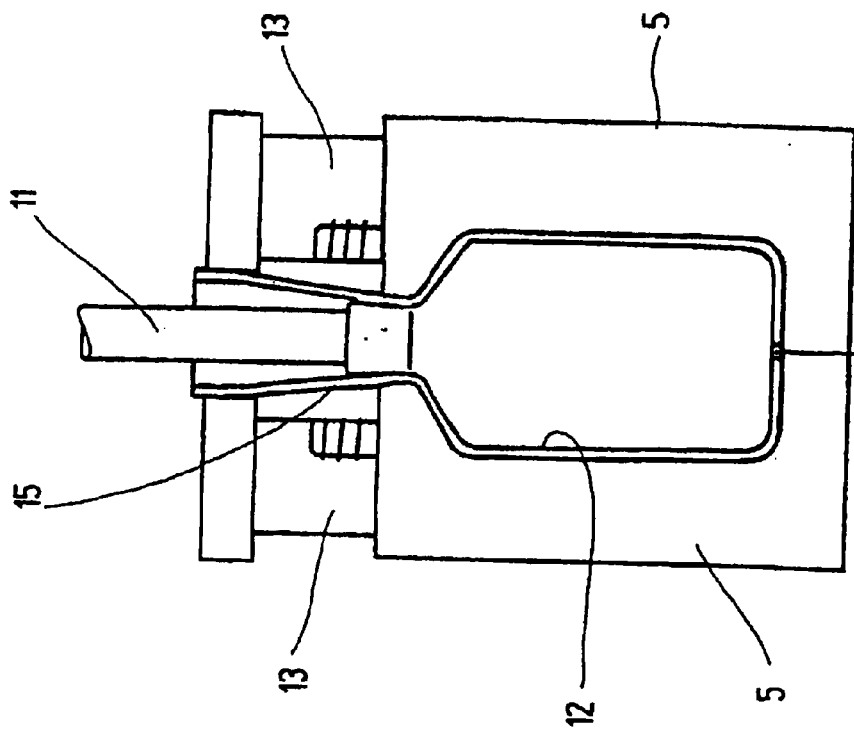
FIGS. 1 and 2 are simplified schematic, side elevational views of a blow mold for forming a conventional container from an extruded plastic tube using conventional production methods, the blow mold being shown opened and closed, respectively.
Figure 2:
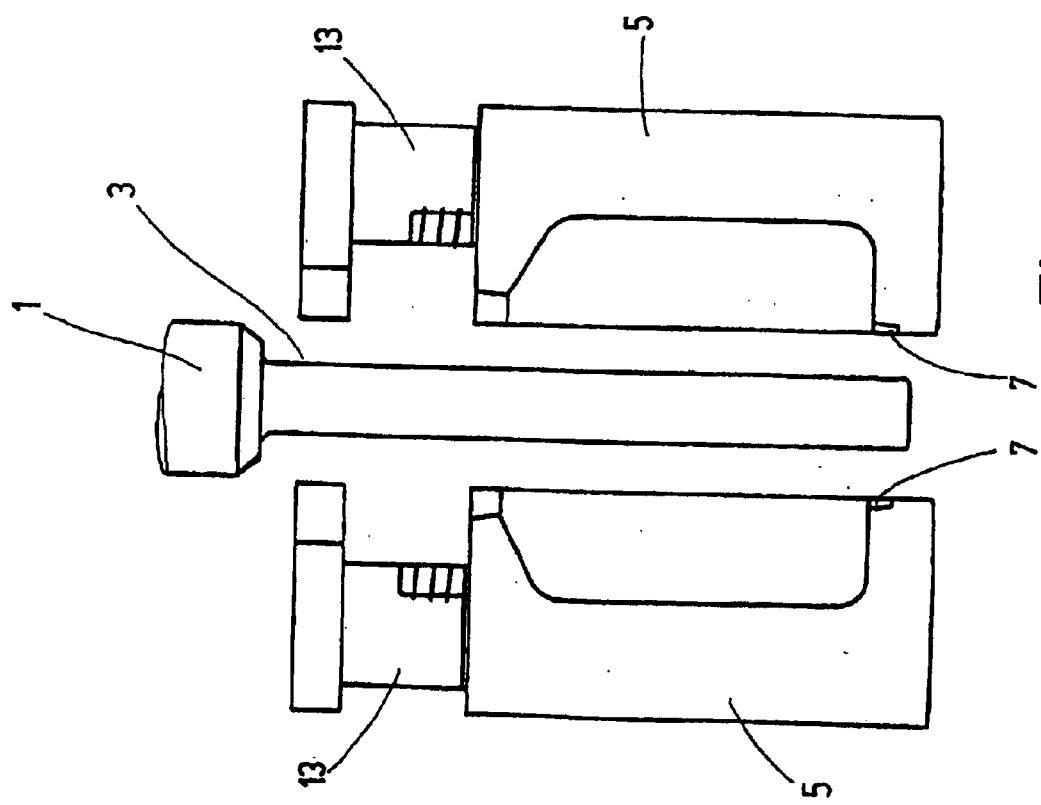

FIGS. 1 and 2 show a conventional apparatus used within the framework of the known bottelpack® system for producing a plastic container of the known type in a blow molding process. An extruder 1 extrudes a tube 3 of molten plastic material between the two mold halves 5 of a blow mold, shown in FIG. 1 in the open state. FIG. 2 shows the blow mold in the closed state, with the parts which mold for the main part of the container 12 to be formed from the tube 3 being moved together. The bottom-side weld edges execute a hotwire welding process on the bottom end of the tube 3 in order to close the tube 3 on a weld seam 9 (FIG. 2). By air supplied via a blowing mandrel 11, the tube 3 is expanded into a container 12, see FIG. 2. Then, the filling process is carried out, for example, via the mandrel 11 shown in FIG. 1 or a separate filling mandrel. The top welding jaws 13, which are movable on the blow mold, are now moved together, causing the container neck to be shaped, and in doing so optionally closing the container 12 by welding. In the examples shown in FIGS. 1 and 2, the weld jaws 13 form an outside thread 17 (FIG. 3) for a screw closure.

Figure 3:
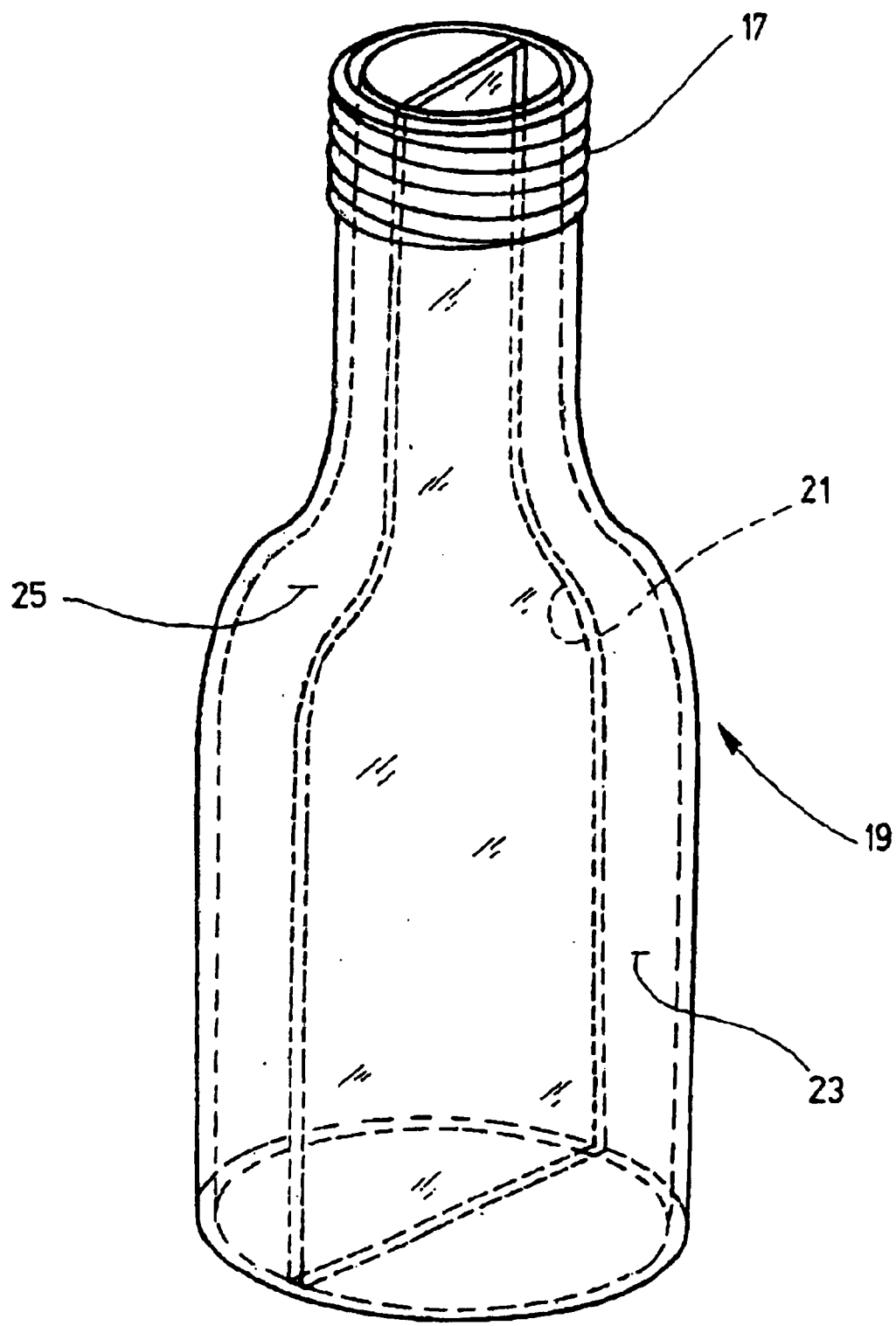
FIG. 3 is a perspective view of a two-chamber container produced using the process according to the present invention, without added contents.
Figure 4:
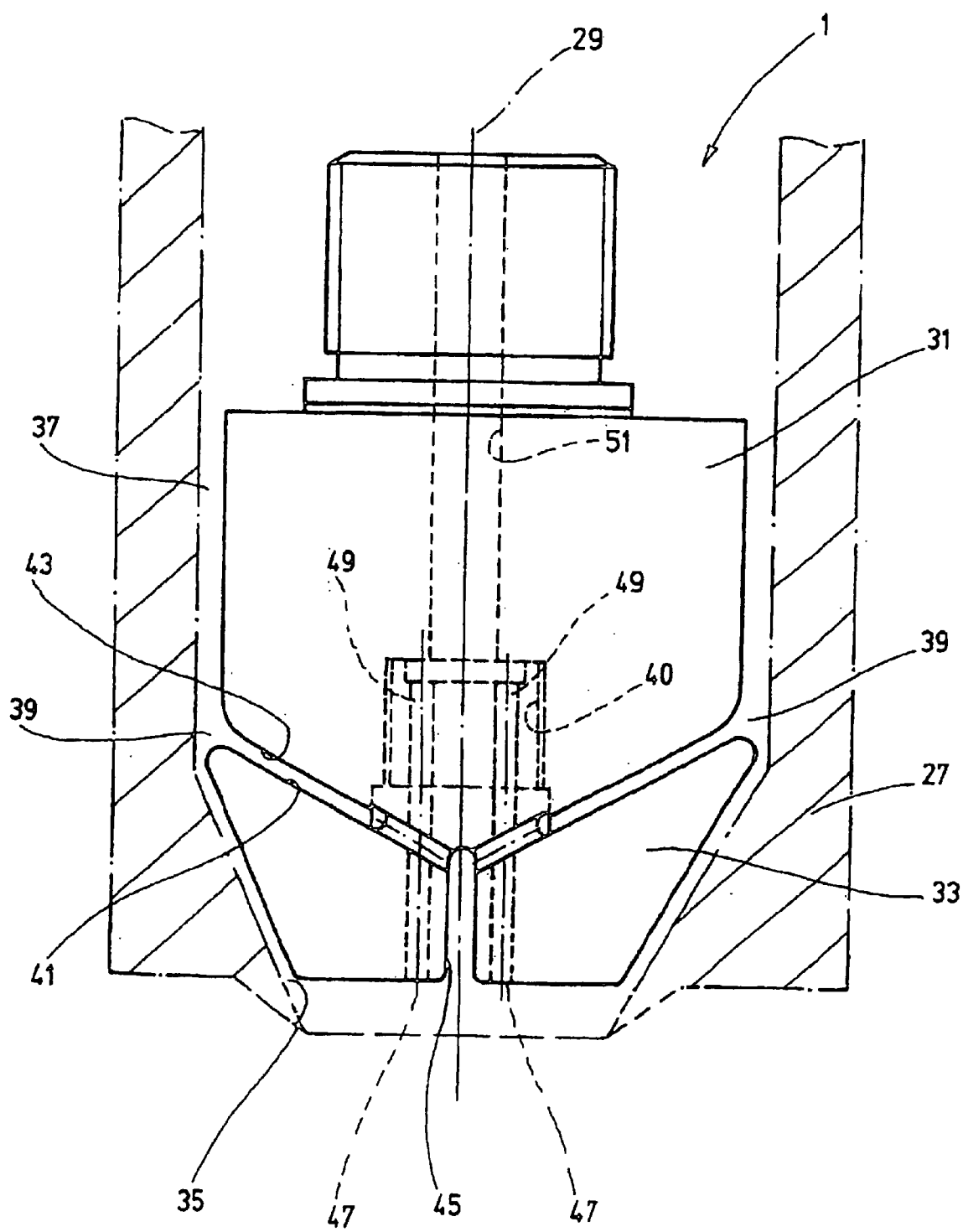
FIG. 4 is a schematically simplified, side elevational view in section of a nozzle arrangement of an extruder for executing the process according to the present invention.
Figure 5:
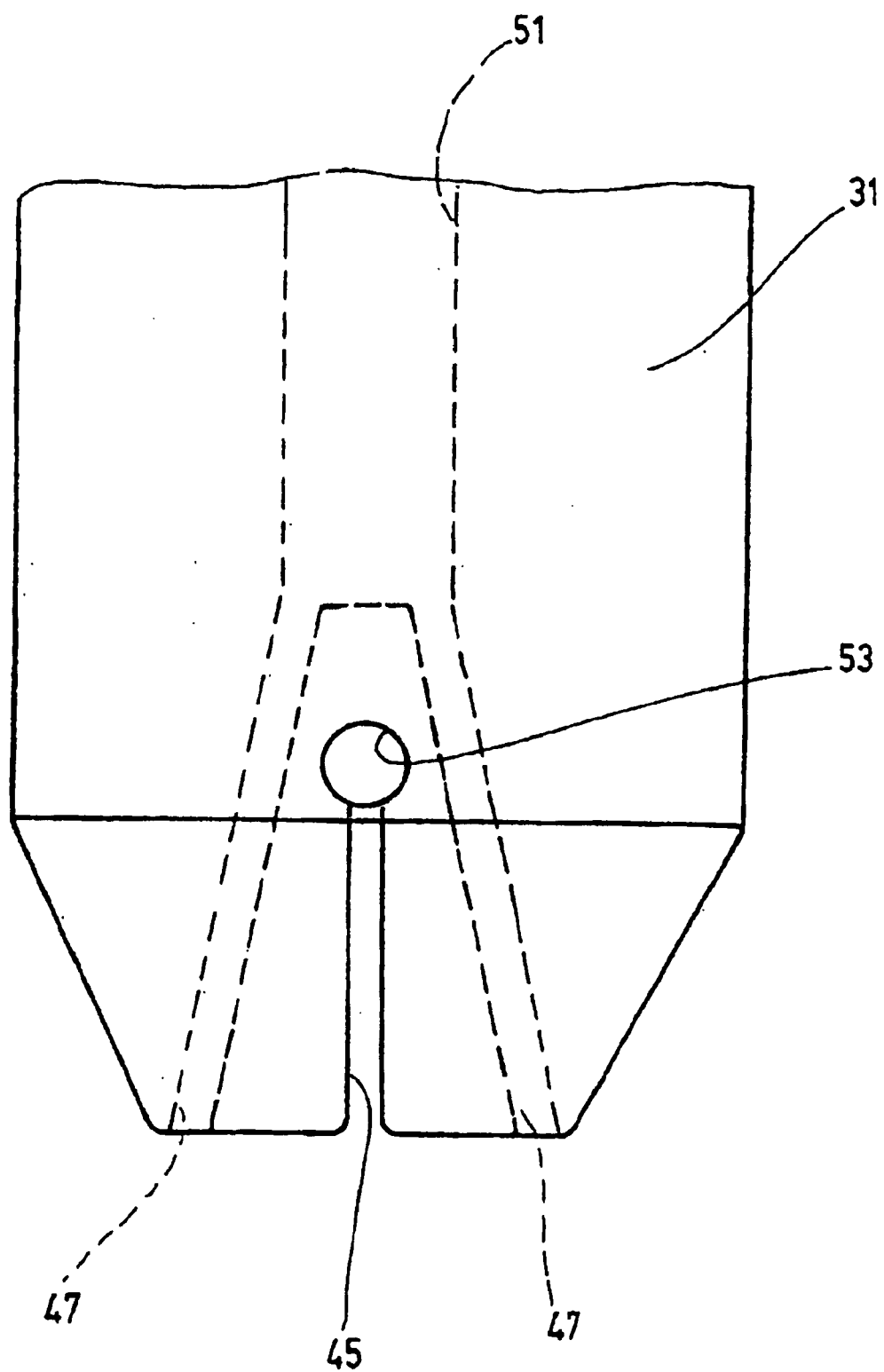
FIG. 5 is an open, schematically simplified, side elevational view of a modified nozzle core of an extruder for carrying out the process according to the present invention.

FIG. 3 shows, in schematic form, a container 19 produced using the process of the present invention. In contrast to the container 12 of FIG. 2, produced in the conventional manner, container 19 has a continuous inner partition 21 which divides the interior of the container 19 into two chambers 23 and 25 separated fluid-tight from one another. FIGS. 4 and 5 show the important parts of an extruder which, in interaction with a blow mold (not shown in these figures), is intended for carrying out the process of the present invention to produce a container which has an inner partition 21, as shown in FIG. 3.

FIG. 4 shows the end of the extruder 1 facing the blow mold (not shown). A nozzle ring 27 of the extruder receives a nozzle core 31 located coaxially to the lengthwise axis 29 of the nozzle. The tip 33 of the nozzle core, with the end area of the nozzle ring 27, defines an annular outlet 35 from which extruded synthetic material emerges in the form of a tube. The molten synthetic material reaches the outlet 35 via an annular gap 37 formed between the nozzle ring 27 and the nozzle core 31. As can be seen from FIG. 4, this annular gap 37 narrows at the transition between the core tip 33 and the part of the nozzle core 31 which follows upstream so that a retaining area 39 for the supplied synthetic material results.

The core tip 33 is screwed to the following, upstream part of the nozzle core 31 via a pin having an outside thread 40. The surfaces of the core tip 33 facing one another and the following part of the nozzle core 31 are located at a distance from one another. The corresponding surface of the core tip 33 forms a funnel surface 41. The facing surface of the remaining nozzle core 31 forms a conical surface 43. These surfaces 41 and 43, in the example shown, include an angle of incline of 65° or 60° relative to the lengthwise axis 29 of the nozzle, and form between themselves a guide for the synthetic material branched off from the annular gap 37. The synthetic material enters the retaining area 39 between the surfaces 41 and 43. Through holes in the pin of the core tip 33, which has the outside thread 40, this branched-off synthetic material travels into an outlet slot 45 formed on the front side of the core tip 33. From there, the branched-off synthetic material emerges as a web extending crosswise within the extruded tube. After expansion of the tube, the web forms the partition 21 in the molded container 19 (FIG. 3). On either side next to the outlet slot 45, i.e. on both sides of the plastic web emerging from the outlet slot 45, in the end surface of the core tip 33, there is one outlet opening 47 each for support air. The openings are connected to a central air channel 51 via branch lines 49 formed in the pin having the outside thread 40.

The air supplied from the air channel 51 via the outlet openings 47 is intended as support air which simply prevents the collapse of the extruded tube and its cementing to the web which forms the partition 21. The container is expanded in the blow mold in an additional working step by means of a blowing and filling mandrel. In an analogous arrangement to the outlet openings 47 of the core tip 33, the blowing and filling mandrel has blow openings for supply of expanding, preferably sterilized blowing air. These blow openings can then also be used as fill openings for supply of the contents to the container chambers.

FIG. 5 shows the front end section of a modified nozzle core 31, without the nozzle ring 27 which surrounds it. In contrast to the above described example, the nozzle core 31 does not have a front core tip screwed on to form a guide for the synthetic material to be branched off in cooperation with the following part of the nozzle core. Rather, in the embodiment of FIG. 5, the guide is a direct connection between the end-side outlet slot 45 and the annular gap which surrounds the nozzle core 31 via transverse holes 53. Holes 53 extend in the nozzle core 31 transversely to the lengthwise axis and are connected to the inner end of the outlet slot 45. The number and cross section of the transverse holes 53 are chosen such that the desired amount of synthetic material which is branched off from the outer annular gap emerges from the outlet slot 45 as the web which extends crosswise within the tube and which forms the partition 21. As in the above described embodiment, on either side next to the outlet slot 45, outlet openings 47 are provided for the support air which is supplied from the central air channel 51.

In both embodiments shown in FIGS. 4 and 5, the thickness of the web emerging from the outlet slot 45 can be adjusted by choosing the ratio between the nozzle gap, i.e. the width of the annular gap 37 formed within the nozzle ring, and the width of the outlet slot 45. In the example of FIG. 4, the distance between the funnel surface 41 and the conical surface 43 can be varied for this adjustment. Likewise, the amount of narrowing of the gap on the retaining area 39 can be varied.

The container 19 produced using the process of the present invention can, if so desired, be filled like conventional single-chamber containers while still within the blow mold and before the head-side, top welding jaws 13 are moved together on the blow mold to mold the container neck on the end side and optionally close it by welding. As indicated above, the two-chamber container 19 can be filled by a combined blowing and filling mandrel or by a filling mandrel which performs only the filling function. For each of the container chambers 23 and 25, the mandrel has an outlet opening for the contents. The mandrel output openings are arranged offset in the same way, relative to the lengthwise axis of the filling mandrel, as is the case for the outlet openings 47 for support air on the nozzle core 31 of the extruder 1. The outlet openings 47 discharge on either side next to the outlet slot 45 which forms the partition 21.

As mentioned above, the shaping of the container neck of the container produced using the process of the present invention is performed by top movable welding jaws 13 on the pertinent blow mold, see FIGS. 1 and 2. In the example of the container 19, shown in FIG. 3, the outside thread 17 is produced for a closure in the form of a screw cap (not shown) which closes both container chambers 23 and 25.

Figure 6:
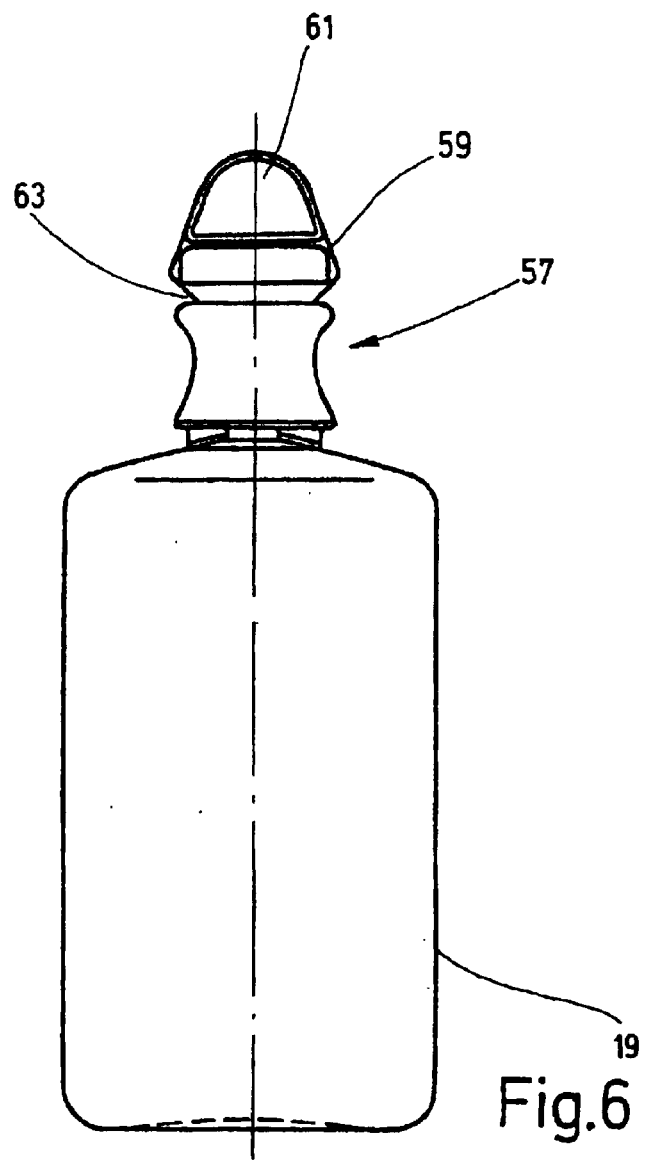
FIG. 6 is a side elevational view of a two-chamber container in which a closure for both chambers is molded onto the container neck and can be opened by means of a twist-off lock.
Figure 7:
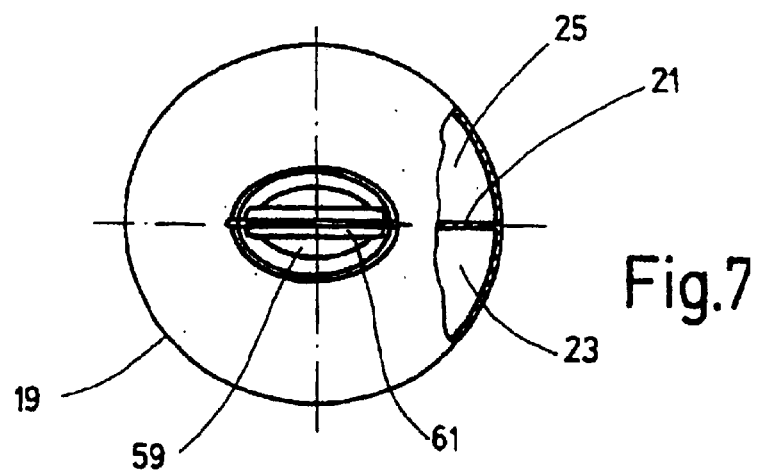
FIG. 7 is a top plan view partially in section of the container of FIG. 6.

Instead of making one such screw closure, a different type of closure can be made by the upper welding jaws 13 in the shaping of the container neck, as is known in the pertinent technology for single-chamber containers, for example, according to the bottelpack® system. As is shown in FIGS. 6 and 7, a rotary lock closure can be molded on the container neck 57. The welding process is carried out such that the two chambers 23 and 25 are closed by twistoff lock 59. Lock 59 can be separated at a disconnect 63, formed as a scored site, by its being turned using its molded-on handle piece 61.

Figure 9:
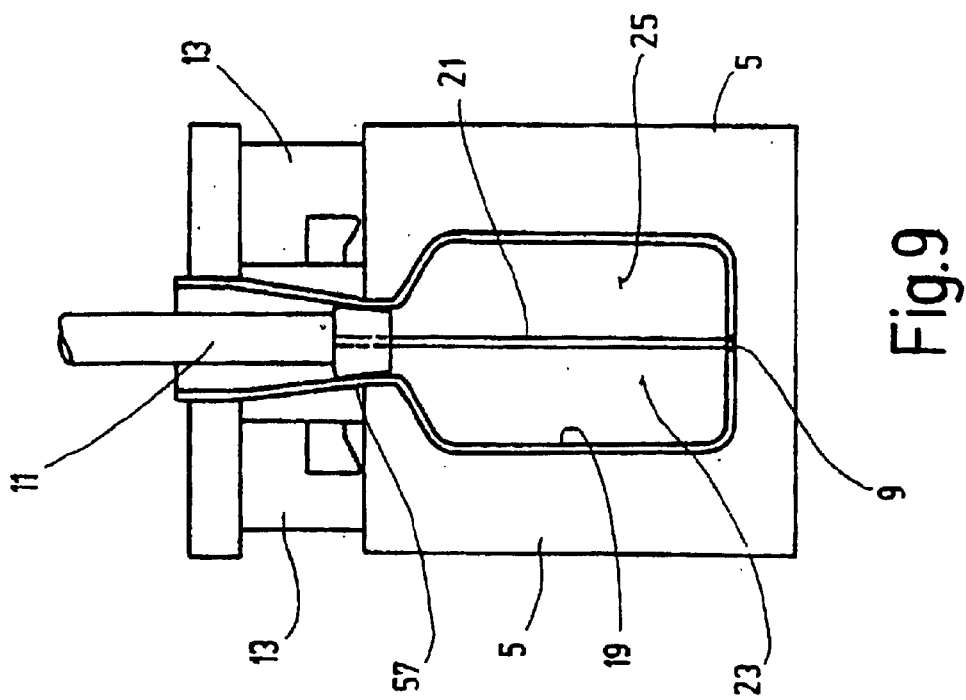
FIGS. 9 to 11 are side elevational views of the apparatus of FIG. 8, with the blow mold being closed and with different process steps in the formation, filling and closing of the container, respectively.
Figure 8:
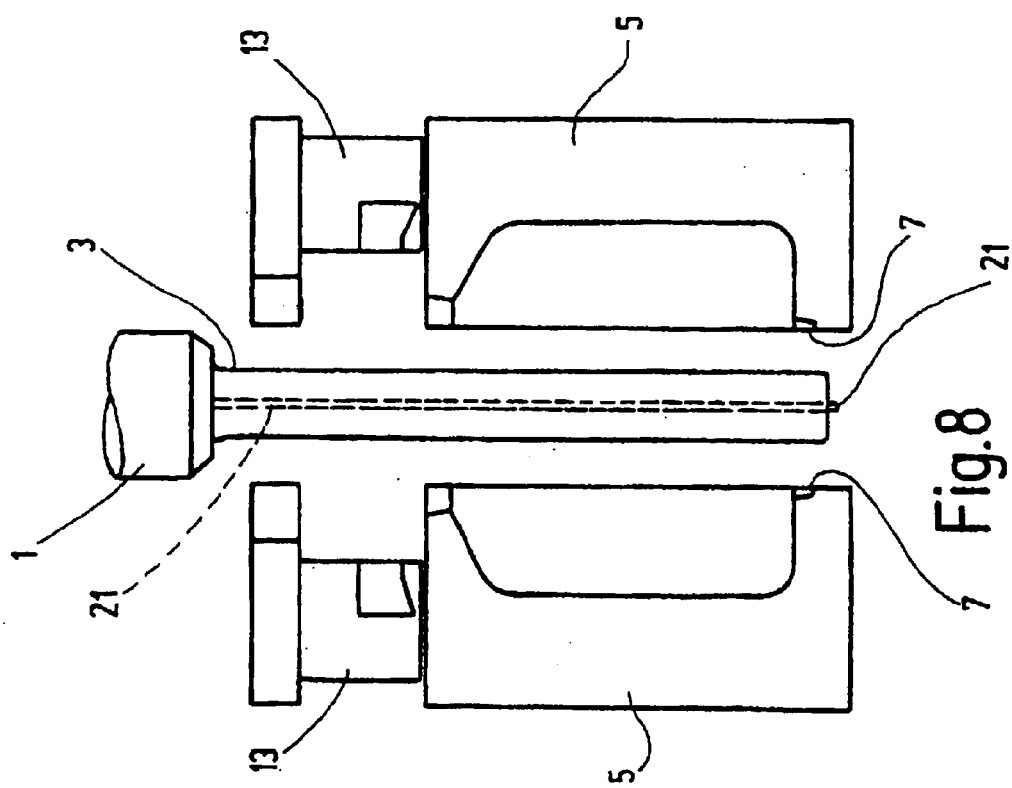
FIG. 8 is a schematically simplified side elevational view, similar to FIG. 1, of an apparatus for carrying out the process of the present invention for forming a two-chamber container, the blow mold being shown open.
Figure 10:
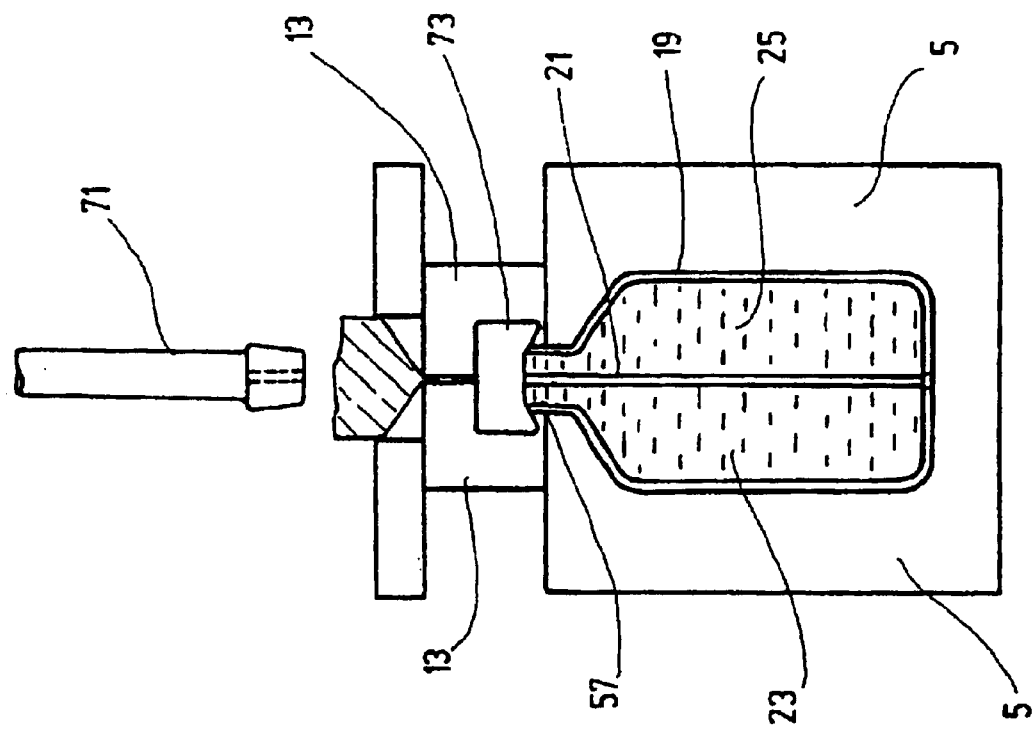
Figure 11:
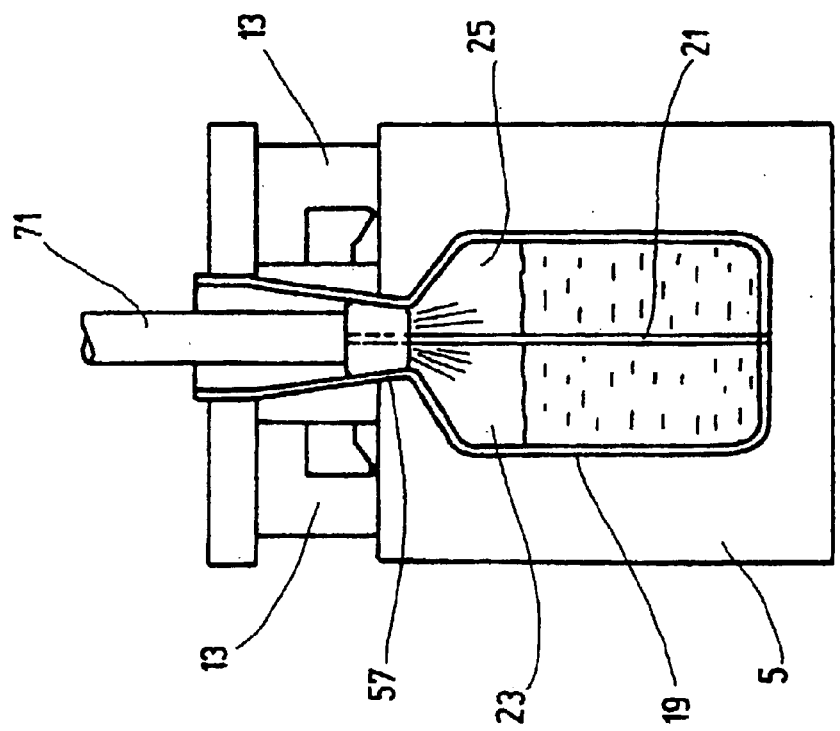

FIGS. 8 to 11 show, in a highly simplified schematic, the progression of the process steps from the initial extrusion process of the synthetic material to complete production of a two-chamber plastic container, with two chambers 23 and 25 filled and hermetically closed by means of a rotary lock closure 73 (FIG. 11). By analogy with FIGS. 1 and 2, FIG. 8 shows the extrusion of the tube 3 with the inner partition 21 into the opened blow mold 5, while FIG. 9 shows expansion into a container 19 by blowing air through the blowing mandrel 11 on either side of the partition 21 after the blow mold 5 has been closed. The bottom-side weld edges 7 carry out a hot-wire welding process by which the tube 3 is closed on the lower end and is joined to the end of the partition 21 on a weld seam 9.

After withdrawing the blowing mandrel 11, the filling mandrel 71 is inserted. The filling mandrel has one fill opening for each container chamber 23 and 25 which are separated by the partition 21. The two chambers 23 and 25 are now filled, while the container 19 is still located within the blow mold 5 (FIG. 10).

After completed filling, the filling mandrel 71 is withdrawn and the top welding jaws 13 are moved together to carry out another welding process on the container neck 57. The container neck 57 is finally molded and, in the example shown, is provided at the same time with a closure which hermetically seals both chambers 23 and 25. In the example shown in FIG. 11, a rotary lock closure 73 is formed so that the container neck is made in the manner as shown in FIGS. 6 and 7, where a twist-off lock 59 with a handle piece 61 is shown. Such twist-off lock makes it possible to twist off the lock 59 at a disconnect 63, by which the two chambers 23 and 25 of the container 19 are opened.

After filling the container and withdrawing the filling mandrel 71, if so desired, insert parts can be placed in the container neck 57 before hermetically sealing the container. They can be functional parts such as a drop insert, a rubber plug, a hollow needle or other foreign part which can be inserted by a vacuum gripper before the welding jaws are moved together to weld around the insert part and at the same part form a hermetic closure.

FIGS. 12 to 14 show a form of the rotary lock closure 75 which is modified compared to FIGS. 6, 7, and 11 for a two-chamber container in which each chamber is closed by a separate spherical closure element 76 and 77. By means of a handle piece 79, which is common to the two closure elements 76 and 77, the two closure elements 76 and 77 can be twisted off at a disconnect 78 so that the two chambers of the container are opened.

While the present invention is described above based on the production of a two-chamber container, the nozzle core 31 of the extruder 1 could have more than one outlet slot 45 to extrude more than one plastic web. Within the plastic tube, several partitions can then be formed, to either side of which blowing air is supplied to mold a multichamber container in the pertinent blow mold.

While various embodiments have been chosen to illustrate the invention, it will be understood by those skilled in the art that various changes and modifications can be made therein without departing from the scope of the invention as defined in the appended claims.

What is claimed is:

1. A process for producing container with two separate chambers, comprising the steps of:

extruding a tube and at least one partition of plasticized synthetic material, such that the partition extends continuously in an interior of the tube, into an opened blow mold from a first end thereof, the tube and the partition having front and back ends;

closing the blow mold such that said blow mold welds the front end of the tube to the front end of the partition at a second end of the blow mold opposite the first end thereof;

supplying blowing air producing a pressure gradient into the tube from the back end thereof for a container neck and adjacent the first end of the blow mold to expand the tube against a molding wall of the closed blow mold to form the container and on each side of the partition to expand and form the separate chambers; and after completion of blowing air, filling the separate chambers of the container located in the closed blow mold.

2. A process according to claim 1 wherein after filling the separate chambers, the container neck is shaped by a welding process by closing movable welding jaws located on the first end of the blow mold, the first end being a top end of the blow mold.

3. A process according to claim 2 wherein the closing of the welding jaws welds the container to close hermetically the separate chambers of the container at the container neck.

4. A process according to claim 3 wherein welding and molding of the container neck forms a closure closing all of the chambers in the container.

5. A process according to claim 3 wherein welding and molding of the container neck forms a separate closure for each of the separate chambers of the container.

6. A process according to claim 5 wherein the welding and forming of the container neck forms a scored site for separation of each separate closure.

7. A process according to claim 6 wherein each separate closure is a rotary lock closure.

8. A process according to claim 5 wherein the welding and forming process of the container neck forms a scored site for separation of the closure.

9. A process according to claim 8 wherein the separate closure is a rotary lock closure.

10. A process for producing container with two separate chambers, comprising the steps of:

extruding a tube and at least one partition of plasticized synthetic material, such that the partition extends continuously in an interior of the tube, into an opened blow mold from a first end thereof, the tube and the partition having front and back ends;

closing the blow mold such that said blow mold welds the front end of the tube to the front end of the partition at a second end of the blow mold opposite the first end thereof;

supplying blowing air producing a pressure gradient into the tube from the back end thereof for a container neck and adjacent the first end of the blow mold to expand the tube against a molding wall of the closed blow mold to form the container and on each side of the partition to expand and form the separate chambers; and after extruding the tube and partition and before expanding the tube to form the container, introducing support air into the tube to prevent collapsing and attaching of the tube to the partition.

* * * * *